United States Patent
Yoo et al.

(10) Patent No.: US 11,356,305 B2
(45) Date of Patent: Jun. 7, 2022

(54) METHOD TO CONVEY THE TX WAVEFORM DISTORTION TO THE RECEIVER

(71) Applicant: QUALCOMM Incorporated, San Diego, CA (US)

(72) Inventors: Taesang Yoo, San Diego, CA (US); June Namgoong, San Diego, CA (US); Naga Bhushan, San Diego, CA (US); Tingfang Ji, San Diego, CA (US); Krishna Kiran Mukkavilli, San Diego, CA (US); Pavan Kumar Vitthaladevuni, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 16/914,011

(22) Filed: Jun. 26, 2020

(65) Prior Publication Data

US 2021/0266203 A1  Aug. 26, 2021

Related U.S. Application Data

(60) Provisional application No. 62/980,793, filed on Feb. 24, 2020.

(51) Int. Cl.
  *H04L 25/03* (2006.01)
  *H04L 25/02* (2006.01)
  *H04L 5/00* (2006.01)

(52) U.S. Cl.
  CPC ...... *H04L 25/03165* (2013.01); *H04L 5/0007* (2013.01); *H04L 25/0254* (2013.01); *H04L 25/0286* (2013.01)

(58) Field of Classification Search
  CPC ............. H04L 25/03165; H04L 5/0007; H04L 25/0254; H04L 25/0286; H04L 5/0053; H04B 1/0475
  See application file for complete search history.

(56) References Cited

U.S. PATENT DOCUMENTS 10,530,305 B2    1/2020  Folkmann et al.
10,833,920 B1 *  11/2020 Ramanadham ..... H04L 41/0816
(Continued)

FOREIGN PATENT DOCUMENTS

CN    107104746 A      8/2017
CN    110474716 A  *  11/2019
(Continued)

OTHER PUBLICATIONS

International Search Report and Written Opinion—PCT/US2021/019111—ISA/EPO—dated Jun. 23, 2021 14 pages.
(Continued)

*Primary Examiner* — Jean B Corrielus
(74) *Attorney, Agent, or Firm* — The Marbury Law Group, PLLC

(57) ABSTRACT

Various embodiments may employ neural networks at transmitting devices to compress transmit (TX) waveform distortion. In various embodiments, compressed TX waveform distortion information may be conveyed to a receiving device. In various embodiments, the signaling of TX waveform distortion information from a transmitting device to a receiving device may enable a receiving device to mitigate waveform distortion in a transmit waveform received from the transmitting device. Various embodiments include systems and methods of wireless communication by transmitting a waveform to a receiving device performed by a processor of a transmitting device. Various embodiments include systems and methods of wireless communication by
(Continued)

receiving a waveform from a transmitting device performed by a processor of a receiving device.

30 Claims, 10 Drawing Sheets

(56) References Cited

U.S. PATENT DOCUMENTS

| | | |
|---|---|---|
| 2018/0322388 A1 | 11/2018 | O'Shea |
| 2019/0253148 A1 | 8/2019 | Islim et al. |
| 2019/0274108 A1 | 9/2019 | O'Shea et al. |
| 2020/0027247 A1 | 1/2020 | Minnen et al. |
| 2020/0092153 A1 | 3/2020 | Sarkas et al. |
| 2020/0210816 A1* | 7/2020 | Luo .................. H03M 13/1102 |
| 2021/0242888 A1* | 8/2021 | Yoshizawa ............ G06N 3/084 |

FOREIGN PATENT DOCUMENTS

| | | | |
|---|---|---|---|
| CN | 110429965 B | * | 10/2020 |
| EP | 2538553 A1 | | 12/2012 |
| WO | WO-2021022685 A1 | * | 2/2021 |

OTHER PUBLICATIONS

Xu S., et al., "Deep Learning Scheme for Recovery of Broadband Microwave Photonic Receiving Systems in Transceivers without Expert Knowledge and System Priors", State Key Laboratory of Advanced Optical Communication Systems and Networks, 2019, 12 Pages.

Jain (Technicolor) S., et al., "Response to the Call for Proposals on Neural Network Compression, Low Displacement Rank Based Compression of Deep Neural Networks", 126th MPEG Meeting, Mar. 25, 2019-Mar. 29, 2019, Geneva, Switzerland (Motion Picture Expert Group or ISO/IEC JTC1/SC29/WG11), Mar. 18, 2019, XP030211527, 12 pages, Retrieved from the Internet: URL: http://phenix.int-evry.fr/mpeg/doc_end_user/documents/126__Geneva/wg11/m47493-v1-m47493.zip m47493.docx [retrieved on Mar. 18, 2019] the whole document.

* cited by examiner

METHOD TO CONVEY THE TX WAVEFORM DISTORTION TO THE RECEIVER

RELATED APPLICATIONS

This application claims the benefit of priority to U.S. Provisional Application No. 62/980,793, entitled "Method To Convey The TX Waveform Distortion To The Receiver" filed Feb. 24, 2020, the entire contents of which are hereby incorporated herein by reference for all purposes.

BACKGROUND

Long Term Evolution (LTE), Fifth Generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

Additionally, the deployment of neural networks, such as deep neural networks, is gaining momentum in today's communication networks. Neural networks can be used on computing devices for a variety of tasks. Neural networks often use a multilayered architecture in which each layer receives input, performs a computation on the input, and generates an output. The output of a first layer of nodes often becomes an input to a second layer of nodes, the output of a second layer of nodes becomes an input to a third layer of nodes, and so on. As such, computations in a neural network are distributed over a population of processing nodes that make up a computational claim.

SUMMARY

Various aspects include systems and methods of wireless communication by transmitting a waveform to a receiving device performed by a processor of a transmitting device. Various aspects may include obtaining transmit waveform distortion information of the transmitting device, compressing the transmit waveform distortion information of the transmitting device into compressed transmit waveform distortion information using an encoder neural network, and sending the compressed transmit waveform distortion information and one or more decoder neural network weights to the receiving device in a configuration that enables the receiving device to use the one or more decoder neural network weights to configure a decoder neural network of the receiving device to recover the transmit waveform distortion information of the transmitting device from the compressed transmit waveform distortion information.

Some aspects may further include determining a model type of the decoder neural network of the transmitting device, and sending the compressed transmit waveform distortion information and the one or more decoder neural network weights to the receiving device may include sending the compressed transmit waveform distortion information, the one or more decoder neural network weights, and the model type to the receiving device. In some aspects, sending the compressed transmit waveform distortion information and the one or more decoder neural network weights to the receiving device may include sending the compressed transmit waveform distortion information and the one or more decoder neural network weights to the receiving device in control information for each slot to be transmitted. In some aspects, sending the compressed transmit waveform distortion information and the one or more decoder neural network weights to the receiving device may include sending the compressed transmit waveform distortion information to the receiving device in control information for each slot to be transmitted and sending the one or more decoder neural network weights to the receiving device in control information at a periodicity greater than every slot to be transmitted. In some aspects, the transmitting device may be a user equipment (UE) computing device and the receiving device may be a base station. In various aspects, the transmitting device may be a base station and the receiving device may be a UE computing device.

Some aspects may further include training the encoder neural network to compress the transmit waveform distortion information of the transmitting device into the compressed transmit waveform distortion information, and training the decoder neural network of the transmitting device to recover the transmit waveform distortion information of the transmitting device from the compressed transmit waveform distortion information, wherein the one or more decoder neural network weights are weights of the trained decoder neural network of the transmitting device. In some aspects, the encoder neural network and the decoder neural network of the of the transmitting device may be trained using unsupervised learning algorithms. In some aspects, training the encoder neural network and training the decoder neural network of the transmitting device may include training the encoder neural network and the decoder neural network of the transmitting device for one transmit antenna of the transmitting device. In some aspects, training the encoder neural network and training the decoder neural network of the transmitting device may include the encoder neural network and the decoder neural network of the transmitting device for each transmit antenna of the transmitting device.

Further aspects may include systems and methods of wireless communication by receiving a waveform from a transmitting device performed by a processor of a receiving device. Various aspects may include receiving compressed transmit waveform distortion information of the transmitting device and one or more weights of a trained decoder neural network of the transmitting device, configuring a decoder neural network of the receiving device using the received one or more weights, and recovering transmit waveform distortion information of the transmitting device from the compressed transmit waveform distortion information of the transmitting device using the configured decoder neural network of the receiving device. Some aspects may further include using the recovered transmit waveform distortion information of the transmitting device to mitigate waveform distortion in a transmit waveform received from the transmitting device.

In some aspects, receiving the compressed transmit waveform distortion information of the transmitting device and the one or more weights of the trained decoder neural network of the transmitting device may include receiving the compressed transmit waveform distortion information of the transmitting device, the one or more weights of the trained decoder neural network of the transmitting device, and a model type of the trained decoder neural network of the transmitting device, and configuring the decoder neural network of the receiving device using the received one or more weights may include configuring the decoder neural network of the receiving device using the received one or more weights and the received model type. In some aspects, the recovered transmit waveform distortion information may be a two-dimensional map of distortion error due to signal clipping of orthogonal frequency division multiplexing (OFDM) symbols within a slot for one or more antennas of the transmitting device. In some aspects, receiving the compressed transmit waveform distortion information of the transmitting device and one or more weights of a trained decoder neural network of the transmitting device may include receiving compressed transmit waveform distortion information of the transmitting device and one or more weights of a trained decoder neural network of the transmitting device in control information for each slot to be transmitted. In some aspects, receiving the compressed transmit waveform distortion information of the transmitting device and one or more weights of a trained decoder neural network of the transmitting device may include receiving compressed transmit waveform distortion information of the transmitting device in control information for each slot to be transmitted and receiving one or more weights of a trained decoder neural network of the transmitting device in control information at a periodicity greater than every slot to be transmitted. In some aspects, the receiving device may be a base station and the transmitting device is a UE computing device. In some aspects, the compressed transmit waveform distortion information and the one or more weights may be received directly from the UE computing device. In some aspects, the compressed transmit waveform distortion information and the one or more weights may be received from a base station other than the transmitting device.

Further aspects may include a base station or a wireless device having a processor configured to perform one or more operations of any of the methods summarized above. Further aspects may include a non-transitory processor-readable storage medium having stored thereon processor-executable instructions configured to cause a processor of a base station or a wireless device to perform operations of any of the methods summarized above. Further aspects include a base station or a wireless device having means for performing functions of any of the methods summarized above. Further aspects include a system on chip for use in a base station or a wireless device that includes a processor configured to perform one or more operations of any of the methods summarized above. Further aspects include a system in a package that includes two systems on chip for use in a base station or a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
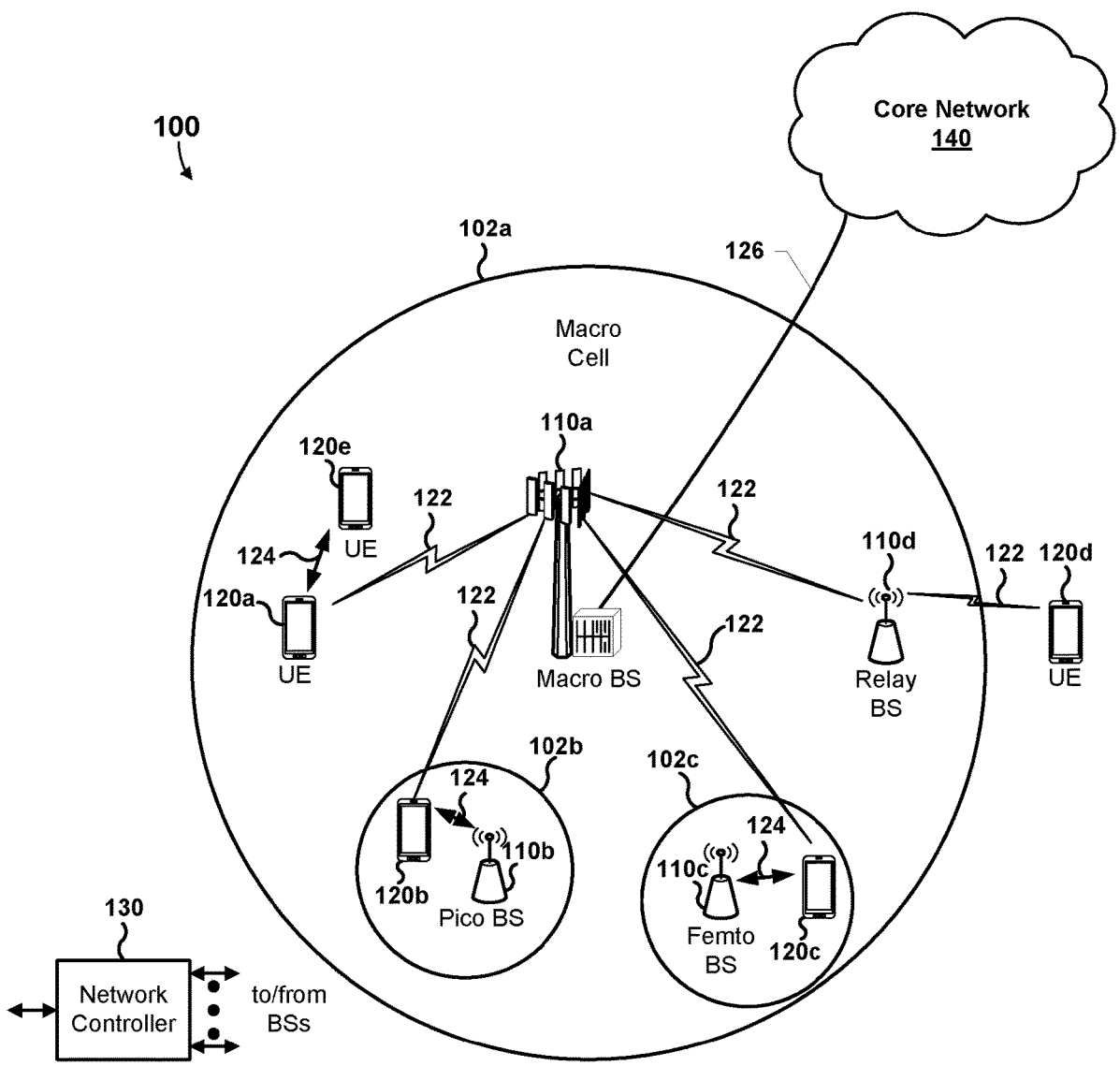
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments enable the signaling of transmit (TX) waveform distortion information to a receiving device from a transmitting device. As used herein the term "transmitting device" refers to any device outputting a TX waveform and the term "receiving device" refers to any device attempting to receive that TX waveform. As an example, in uplink (UL) communications in a Third Generation Partnership Project (3GPP) network, the transmitting device may be a User Equipment (UE) computing device and the receiving device may be a base station (e.g., a Next Generation NodeB (gNB)). As another example, in downlink (DL) communications the transmitting device may be a base station (e.g., a gNB) and the receiving device may be a UE computing device.

Various embodiments may employ neural networks executing within transmitting devices to compress TX waveform distortion. In various embodiments, compressed TX waveform distortion information may be conveyed to a receiving device. In various embodiments, the signaling of TX waveform distortion information from a transmitting device to a receiving device may enable a receiving device to mitigate waveform distortion in a transmit waveform received from the transmitting device. In various embodiments, the presence of TX waveform distortion information for the transmitting device decoded by the receiving device may enable the transmitting device to utilize its available transmit power efficiently.

In wireless communications between transmitting devices and receiving devices, distortion of the TX waveform sent from the transmitting device, such as signal clipping, may hinder the successful reception of the TX waveform by the receiving device. Distortion of the TX waveform may be caused by various factors, such as components of the transmitting device itself. For example, power amplifiers of a transmitting device may cause distortion of the TX waveform and the amount of distortion may increase as the power levels of the power amplifiers increase. Conventional transmitting devices mitigate the distortion caused by power amplifiers to the TX waveform by keeping power levels of the power amplifiers below certain levels. This reduction of the power levels of the power amplifiers of the transmitting device can reduce the distortion of the TX waveform, but also can result in less efficient utilization of transmit power (e.g., a less powerful than possible transmit signal).

Various embodiments enable neural networks at receiving devices to recover TX waveform distortion information of a transmitting device and use the recovered TX waveform distortion information of the transmitting device to mitigate waveform distortion in a TX waveform received from the transmitting device. The presence of TX waveform distortion information for the transmitting device at the receiving device may enable the transmitting device to utilize its available transmit power efficiently (e.g., by using power amplifiers at full power) because the distortion caused by power amplifiers may be mitigated at the receiving device side.

In various embodiments, a transmitting device may obtain TX waveform distortion information of the transmitting device. In some embodiments, the TX waveform distortion information may be a two-dimensional map of distortion error due to signal clipping of orthogonal frequency division multiplexing (OFDM) symbols within a slot for one or more antennas of the transmitting device. The TX waveform distortion information may be configured such that a receiving device may use the TX waveform distortion information of the transmitting device to mitigate waveform distortion in a TX waveform received from the transmitting device. For example, the TX waveform distortion information may be used by a receiving device to mitigate the TX waveform distortion of multiple OFDM symbols. The TX waveform distortion information may depend on the data that may be sent on each slot because the data to be sent may impact the OFDM waveform. Thus, the provisioning of TX waveform distortion information for each slot may enable a receiving device to mitigate the TX waveform distortion on a per slot basis.

In various embodiments, a transmitting device may include an encoder neural network and decoder neural network pair. In various embodiments, the encoder neural network and the decoder neural network may be deep neural networks. In various embodiments, there may be an encoder and decoder pair for each transmit antenna of the transmitting device. The encoder neural network may be configured to compress information. For example, the encoder neural network may be configured to compress TX waveform distortion information into compressed TX waveform distortion information, and the decoder neural network may be a configured to decompress information. For example, the decoder neural network may be configured to recover the TX waveform distortion information from compressed TX waveform distortion information. In various embodiments, a receiving device may also include a decoder neural network.

In various embodiments, a transmitting device may train an encoder neural network of the transmitting device to compress the TX waveform distortion information of the transmitting device into compressed TX waveform distortion information of the transmitting device. In various embodiments, a transmitting device may train a decoder neural network of the transmitting device to recover the TX waveform distortion information of the transmitting device from the compressed TX waveform distortion information of the transmitting device. In various embodiments, the encoder neural network of the transmitting device and the decoder neural network of the of the transmitting device may be trained using unsupervised learning algorithms. In various embodiments, training the encoder neural network of the transmitting device and training the decoder neural network of the transmitting device may include training the encoder neural network and the decoder neural network for one transmit antenna of the transmitting device. In various embodiments, training the encoder neural network of the transmitting device and training the decoder neural network of the transmitting device may be performed periodically. For example, training may occur upon initial start-up of the transmitting device, daily, upon registration with a new network, etc. In various embodiments, the encoder neural network of the transmitting device and the decoder neural network of the of the transmitting device may be trained using unsupervised learning algorithms.

In various embodiments, a transmitting device may determine a model type of the trained decoder neural network of the transmitting device and weights of the trained decoder neural network of the transmitting device.

A model type may be a structure of the neural network, such as a description of the types, numbers, and/or interconnections (e.g., layer layout) of the nodes in the neural network. Model types may be actual representations of the neural network elements themselves and/or descriptors (e.g., model names, model numbers, model tags) that indicate the structure of the neural network, such as a description of the types, numbers, and/or interconnections (e.g., layer layout) of the nodes in the neural network. In various embodiments, a model type of a decoder neural network of the transmitting device may provide information to a receiving device to reconstitute a specific structure of the decoder neural network as was trained at the transmitting device.

Weights of a neural network may be the values associated with the interconnections between the nodes of the neural network after training of the neural network. The weights of the trained decoder neural network of the transmitting device may be the values associated with the interconnections between the nodes of the decoder neural network after training at the transmitting device. In various embodiments, two decoder neural networks having the same model type may have the same structure such that applying the same weights to the two decoder neural networks will result in the same decompressed output of the two decoder neural networks based on the same compressed input being provided to each decoder neural network.

In various embodiments, a receiving device having a model type of a trained decoder neural network of the transmitting device and weights of the trained decoder neural network of the transmitting device may configure a decoder neural network of the receiving device to recover the same decompressed output as would be recovered by the trained decoder neural network of the transmitting device from a common compressed input without having to spend time to actually train the decoder neural network of the receiving device.

In various embodiments, a transmitting device may send the compressed TX waveform distortion information of the transmitting device, a model type of the trained decoder neural network of the transmitting device, and weights of the trained decoder neural network of the transmitting device to the receiving device. The compressed TX waveform distortion information of the transmitting device, the model type, and the weights may be sent to the receiving device in a configuration that enables the receiving device to use the model type and the weights to configure a decoder neural network of the receiving device to recover the TX waveform distortion information of the transmitting device from the compressed TX waveform distortion information of the transmitting device. In some embodiments, the compressed TX waveform distortion information of the transmitting device, the model type, and the weights may be sent together. In some embodiments, the compressed TX waveform distortion information of the transmitting device, the model type, and the weights may be sent separately. In some embodiments, the compressed TX waveform distortion information of the transmitting device, the model type, and the weights may be sent in overhead information exchanged between the transmitting computing device and the receiving computing device. In some embodiments, the compressed TX waveform distortion information of the transmitting device may be sent in control information for each slot to be transmitted. The compressed TX waveform distortion information may depend on the data that may be sent on each slot because the data to be sent may impact the OFDM waveform. Providing the compressed TX waveform distortion information on a per slot basis may enable a receiving device to mitigate the TX waveform distortion on a per slot basis. In some embodiments, compressed TX waveform distortion information and the model type and the weights may be signaled at different periodicities. In some embodiments, the model type and the weights may be signaled less frequently than the compressed TX waveform distortion information of the transmitting device. For example, compressed TX waveform distortion information may be sent in control information for each slot and the weights may be sent at a periodicity greater than every slot (e.g., less frequently than the compressed TX waveform distortion information). Weights and/or model types may be sent at much larger time scales than compressed TX waveform distortion information as the encoder neural network and decoder neural network of the transmitting device may be updated infrequently. In some embodiments, a model type may not need to be sent as the model type may already be known at a receiving device.

In various embodiments, a receiving device may receive compressed TX waveform distortion information of a transmitting device, a model type of a trained decoder neural network of the transmitting device, and weights of the trained decoder neural network of the transmitting device. In some embodiments, the compressed TX waveform distortion information of the transmitting device, the model type, and the weights may be sent in overhead information. In some embodiments, the compressed TX waveform distortion information of the transmitting device may be received in control information for each slot to be transmitted. In some embodiments, a model type may not need to be received as the model type may already be known at the receiving device. As one example, a single default model type may be used for both the decoder neural network of the transmitting device and the decoder neural network of the receiving device. As another example, the model type may be known based on device type, network, or other settings at the receiving device.

In some embodiments, the compressed TX waveform distortion information, the model type, and the weights may be received directly from the transmitting device. For example, the transmitting device may be a UE computing device and the UE computing device may send the compressed TX waveform distortion information, the model type, and the weights to a base station as part of initial registration procedures between the UE computing device and the base station to receive services in the cell served by the base station. The base station may be the receiving device and may utilize the compressed TX waveform distortion information, the model type, and the weights to mitigate distortion in the TX waveform sent by the UE computing device.

In some embodiments, the compressed TX waveform distortion information, the model type, and the weights may be received from a base station other than the transmitting device. For example, the compressed TX waveform distortion information, the model type, and the weights may be values stored and shared among devices in a communication network.

In some embodiments, the compressed TX waveform distortion information, the model type, and/or the weights of base stations may be shared among devices, such that a device may receive the compressed TX waveform distortion information, the model type, and the weights for another device indirectly. As one example, base stations of neighbor cells may share their model types and weights with one another and with UE computing devices in their respective cells to support UE computing device mobility and handoff. As another example, UE computing model type and weights may be centrally stored such that a base station may retrieve the model type and the weights for a UE computing device upon discovery of the UE computing device without the UE computing device needing to directly transmit the model type and the weights to the base station, etc. As another example, base station compressed TX waveform distortion information, model type, and/or weights may be centrally stored such that a UE computing device may retrieve the compressed TX waveform distortion information, the model type, and/or the weights for a next base station before entering the coverage area of that base station and without the UE computing device needing to directly receive the compressed TX waveform distortion information, the model type, and/or the weights from that next base station, etc.

In various embodiments, a receiving device may configure a decoder neural network of the receiving device using the received model type and weights. A model type may be a structure of the neural network, such as a description of the types, numbers, and/or interconnections (e.g., layer layout) of the nodes in the neural network. Model types may be actual representations of the neural network elements themselves and/or descriptors (e.g., model names, model numbers, model tags) that indicate the structure of the neural network, such as a description of the types, numbers, and/or interconnections (e.g., layer layout) of the nodes in the neural network. Weights of a neural network may be the values associated with the interconnections between the nodes of the neural network after training of the neural network. In various embodiments, a receiving device having a model type of a trained decoder neural network of the transmitting device and weights of the trained decoder neural network of the transmitting device may configure a decoder neural network of the receiving device to recover the same decompressed output as would be recovered by the trained decoder neural network of the transmitting device from the compressed TX waveform distortion information of the transmitting device received from the transmitting device. In this manner, the receiving device may configure its decoder neural network as a trained neural network without having to spend time to train its decoder neural network.

In various embodiments, a receiving device may recover the TX waveform distortion information of the transmitting device from the compressed TX waveform distortion information of the transmitting device using the configured decoder neural network of the receiving device. In some embodiments, the recovered TX waveform distortion information may include a two-dimensional map of distortion error due to signal clipping of OFDM symbols within a slot for one or more antennas of the transmitting device.

In various embodiments, a receiving device may use the recovered TX waveform distortion information of the transmitting device to mitigate waveform distortion in a TX waveform received from the transmitting device. Mitigating the waveform distortion may include using the recovered TX waveform distortion information to reconstitute the original TX waveform signal at the receiving device. By mitigating the waveform distortion, the receiving device may compensate for any distortion caused by the transmitting device itself, such as distortion caused by power amplifiers of the transmitting device.

The terms "wireless device" and "UE computing device" are used interchangeably herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices or UE computing devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110*d*). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (UE computing devices) 120*a*, 120*b*, 120*c* may be dispersed throughout communications system 100, and each wireless device may be stationary or mobile. A wireless device also may be referred to as an access terminal, a terminal, a mobile station, a subscriber unit, a station, etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use tell sinology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A wireless device 120*a*-120*e* may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
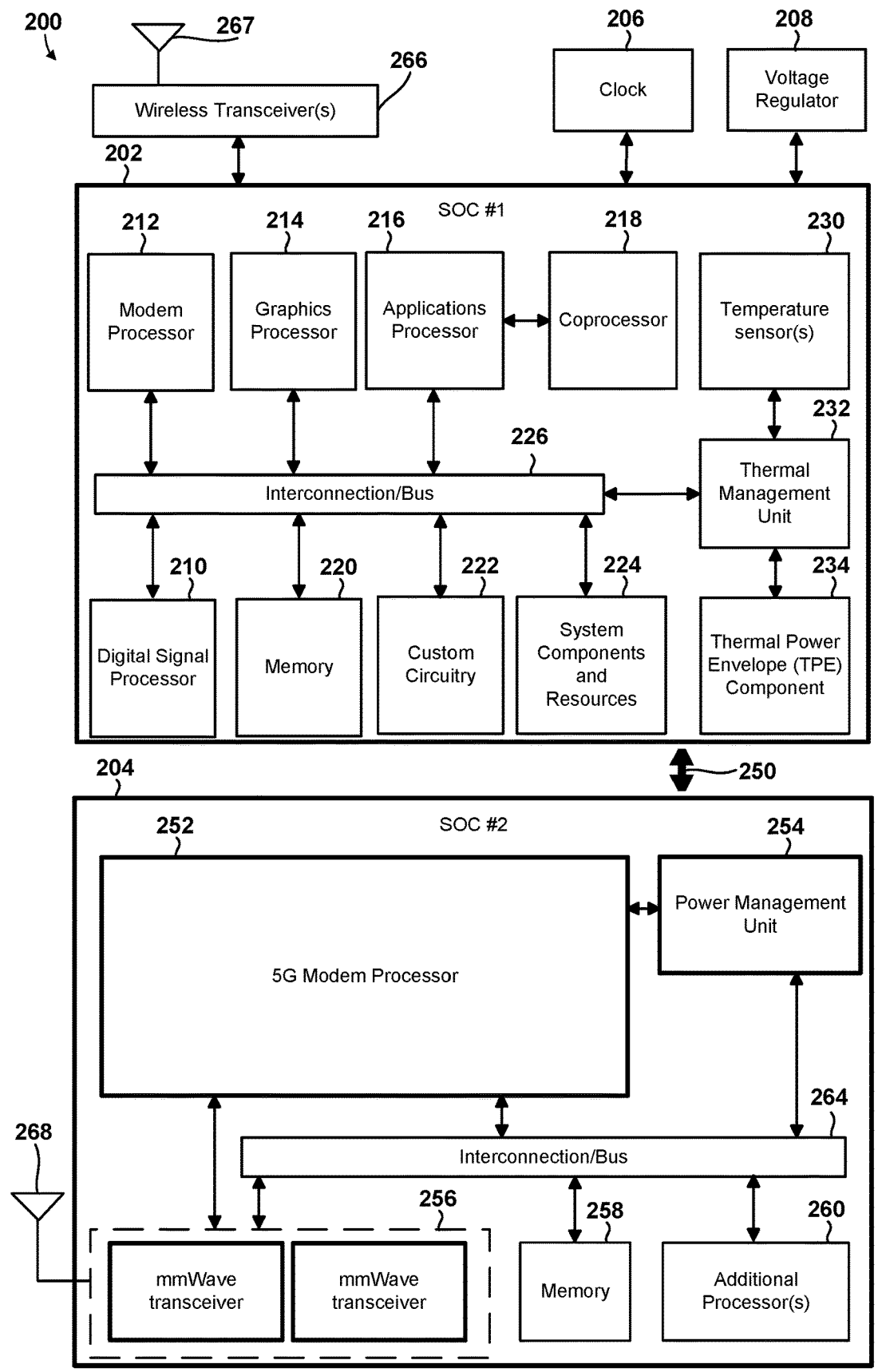
FIG. 2 is a component block diagram illustrating an example computing and wireless modem system suitable for implementing any of the various embodiments.

In some embodiments, two or more mobile devices 120a-e (for example, illustrated as the wireless device 120a and the wireless device 120e) may communicate directly using one or more sidelink channels 124 (for example, without using a base station 110 as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) that includes a two SOCs 202, 204 coupled to a clock 206, a voltage regulator 208, and one or more wireless transceivers 266 configured to send and receive wireless communications via one or more antennas 267 to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc. The plurality of mmWave transceivers 256 may be connected to one or more antennas 268 and may be configured to send and receive wireless communications via the one or more antennas 268 to/from wireless devices, such as a base station 110a.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
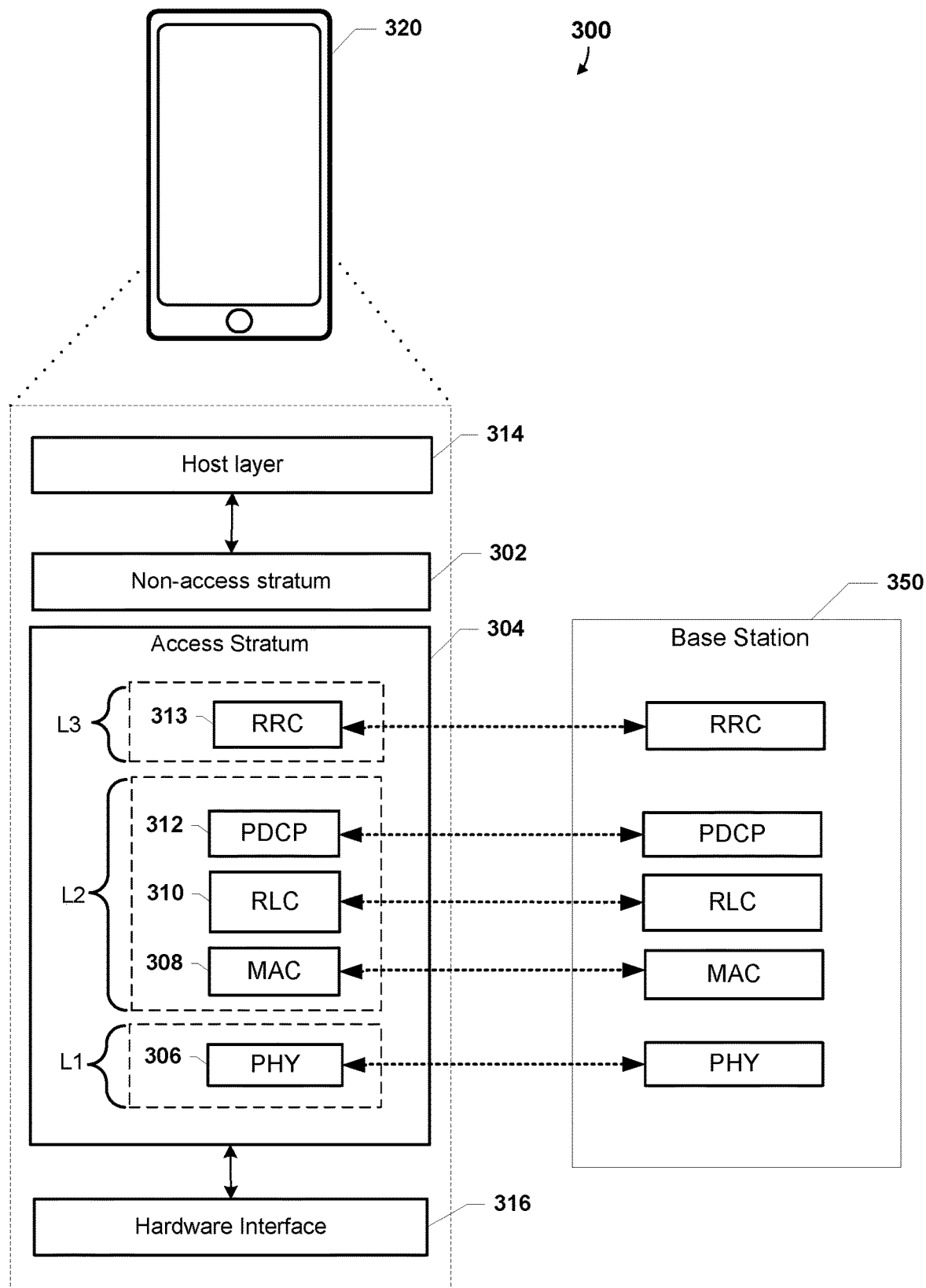
FIG. 3 is a component block diagram illustrating a software architecture including a radio protocol stack for the user and control planes in wireless communications suitable for implementing any of the various embodiments.

FIG. 3 is a software architecture diagram illustrating a software architecture 300 including a radio protocol stack for the user and control planes in wireless communications suitable for implementing any of the various embodiments. With reference to FIGS. 1-3, the wireless device (UE computing device) 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
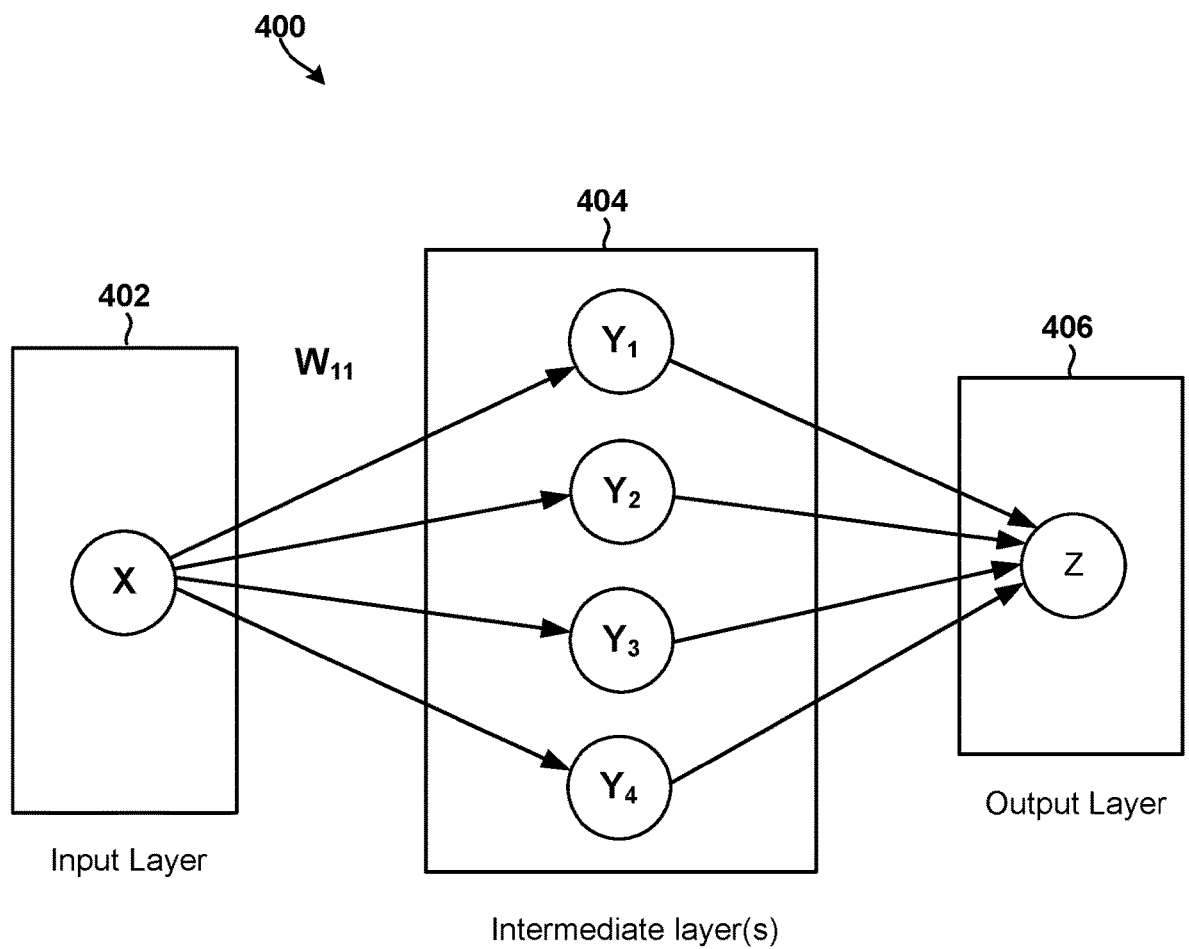
FIG. 4 is a functionality component block diagram illustrating an example software implemented neural network suitable for implementing any of the various embodiments.

FIG. 4 illustrates an example neural network 400 that may be implemented in a computing device for implementing any of the various embodiments. With reference to FIGS. 1-4, any device in a communication system (e.g., 100), such as a wireless device (UE computing device) (e.g., wireless device 120a-120e, 200, 320) and/or a base station (e.g., the base station 110a, 350, etc.), may implement the neural network 400. The neural network 400 may be a neural network dedicated to any purpose, such as an encoder neural network, a decoder neural network, etc. As one example, the neural network 400 may be a feed-forward deep neural network. The neural network 400 may be distributed among one or more processors (e.g., the processors 212, 214, 216, 218, 252, 260).

The neural network 400 may include an input layer 402, intermediate layer(s) 404, and an output layer 406. Each of the layers 402, 404, 406 may include one or more processing nodes that receive input values, perform computations based the input values, and propagate the result (activation) to the next layer. The structure of the neural network may be the description of the types, numbers, and/or interconnections (e.g., layers 402, 404, 406 layout) of the nodes in the neural network 400. Model types may be actual representations of the neural network elements themselves (e.g., the layers 402, 404, 406 and the nodes therein) and/or descriptors (e.g., model names, model numbers, model tags) that indicate the structure of the neural network 400, such as a description of the types, numbers, and/or interconnections (e.g., layer 402, 404, 406 layout) of the nodes in the neural network 400. As an example, the model of neural network 400 as illustrated in FIG. 4 may be an input layer 402 with a single input node X, an intermediate layer 404 with four nodes Y1, Y2, Y3, and Y4, and an output layer 406 with a single output node Z. While illustrated with respect to specific layers 402, 404, 406 and nodes X, Y1, Y2, Y3, Y4, and Z, the neural network 400 may include additional layers, nodes, and/or interconnections therebetween and the neural network 400 may be any type of neural network 400.

In feed-forward neural networks, such as the neural network 400, all of the computations are performed as a sequence of operations on the outputs of a previous layer. The final set of operations generate the output of the neural network, such as a compressed information in an encoder neural network, decompressed information in a decoder neural network, etc. Weights of a neural network 400 may be the values associated with the interconnections between the nodes of the neural network 400 after training of the neural network 400. For example, the weights W11 illustrated in FIG. 4 are values associated with the interconnections between the X node of the neural network 400 and the Y nodes, Y1, Y2, Y3, Y4, after training of the neural network 400. The final output of the neural network 400 may correspond to a task that the neural network 400 may be performing, such as operating as an encoder to compress TX waveform distortion information, operating as a decoder to recover TX waveform distortion information from compressed TX waveform information, etc.

In the neural network 400, learning may be accomplished during a training process in which the values of the weights of each layer 402, 404, 406 are determined. After the training process is complete, the neural network 400 may successfully perform its intended purpose. For example, a trained encoder network may successfully compress information, such as successfully compress TX waveform distortion information into compressed TX distortion waveform information. As another example, a trained decoder neural network may successfully decompress information, such as successfully decompress compressed TX distortion waveform information into TX waveform distortion information (also referred to as recovered TX waveform distortion information).

Training the neural network 400 may include causing the neural network 400 to process a task for which an expected/desired output is known, and comparing the output generated by the neural network 400 to the expected/desired output. Training may be supervised or unsupervised training. During training, the weights of the neural network 400 may be updated until the output of the neural network 400 matches the expected/desired output. The weights of the trained decoder neural network of the transmitting device may be the values associated with the interconnections between each node of the decoder neural network after training at the transmitting device. For example, the weights of the trained neural network 400 as illustrated in FIG. 4 may include the weights W11 that are values associated with the interconnections between the X node of the neural network 400 and the Y nodes, Y1, Y2, Y3, Y4, after training of the neural network 400. For example, in the example illustrated in FIG. 4, Y may be related to X by the equation Y=W11*X where Y=[Y1, Y2, Y3, Y4] and W11 is a 1×4 matrix such that W11 are the weights, and similarly Z may be related to Y by other weights.

Providing the model of the neural network 400 and the weights of the trained neural network 400 may enable another instance of the same neural network 400 to be created. In various embodiments, two decoder neural networks having the same model type may have the same structure such that applying the same weights to the two decoder neural networks will result in the same output (e.g., same decompressed output when the neural network 400 is a decoder neural network) of the two neural networks based on the same input (e.g., the same compressed input, such as compressed TX waveform distortion information) being provided to each decoder neural network. In this manner, a device having a model type of a trained neural network 400 and weights of the trained neural network 400 may configure a second neural network to correspond to neural network 400 (e.g., configure that second neural network to be a copy of the trained neural network 400) to generate the same output as would be generated by the trained neural network 400 for a same input without having to spend time to actually train the second neural network.

Figure 5:
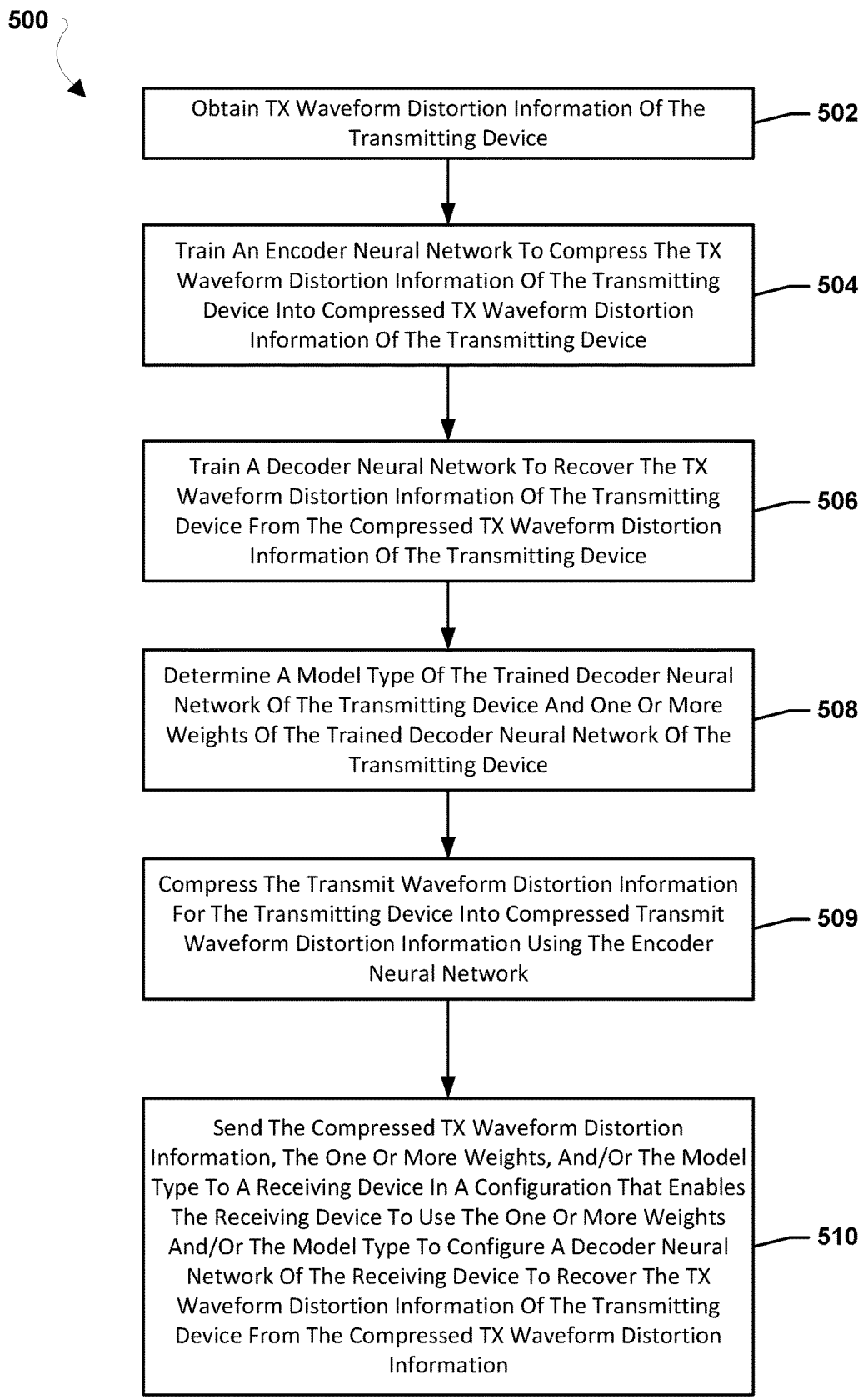
FIG. 5 is a process flow diagram illustrating operations of a method for wireless communication performed by a processor of a transmitting device transmitting a waveform to a receiving device in accordance with various embodiments.

FIG. 5 is a process flow diagram of an example 500 for wireless communication performed by a processor of a transmitting device transmitting a waveform to a receiving device according to various embodiments. With reference to FIGS. 1-5, the method 500 may be implemented by a processor (such as 212, 216, 252 or 260) of a transmitting device, such as a wireless device (UE computing device) (e.g., wireless device 120a-120e, 200, 320) and/or a base station (e.g., the base station 110a, 350, etc.) implementing one or more neural networks (e.g., neural network 400). As one example, in UL communications in a 3GPP network, the transmitting device may be a UE computing device and the receiving device may be a base station (e.g., a gNB). As another example, in DL communications in a 3GPP network, the transmitting device may be a base station (e.g., a gNB) and the receiving device may be a UE computing device.

In block 502, the processor of the transmitting device may perform operations including obtaining TX waveform distortion information of the transmitting device. In some embodiments, the TX waveform distortion information may be a two-dimensional map of distortion error due to signal clipping of orthogonal frequency division multiplexing (OFDM) symbols within a slot for one or more antennas of the transmitting device. The TX waveform distortion information may be configured such that a receiving device may use the TX waveform distortion information of the transmitting device to mitigate waveform distortion in a TX waveform received from the transmitting device. For example, the TX waveform distortion information may be used by a receiving device to mitigate the TX waveform distortion of multiple OFDM symbols.

In block 504, the processor of the transmitting device may perform operations including training an encoder neural network to compress the TX waveform distortion information of the transmitting device into compressed TX waveform distortion information of the transmitting device.

In block 506, the processor of the transmitting device may perform operations including training a decoder neural network to recover the TX waveform distortion information of the transmitting device from the compressed TX waveform distortion information of the transmitting device.

In various embodiments, a transmitting device may include an encoder neural network and decoder neural network pair. In some embodiments, the encoder neural network and the decoder neural network may be deep neural networks. In some embodiments, there may be an encoder and decoder pair for each transmit antenna of the transmitting device. The encoder neural network may be configured to compress information. For example, the encoder neural network may be configured to compress TX waveform distortion information into compressed TX waveform distortion information. The decoder neural network may be a configured to decompress information. For example, the decoder neural network may be configured to recover the TX waveform distortion information from compressed TX waveform distortion information.

In some embodiments, the encoder neural network of the transmitting device and the decoder neural network of the of the transmitting device may be trained using unsupervised learning algorithms. In some embodiments, training the encoder neural network of the transmitting device and training the decoder neural network of the transmitting device may include training the encoder neural network and the decoder neural network for one transmit antenna of the transmitting device. In some embodiments, training the encoder neural network of the transmitting device and training the decoder neural network of the transmitting device may be performed periodically. For example, training may occur upon initial start-up of the transmitting device, daily, upon registration with a new network, etc. In some embodiments, the encoder neural network of the transmitting device and the decoder neural network of the of the transmitting device may be trained using unsupervised learning algorithms.

In block 508, the processor of the transmitting device may perform operations including determining a model type of the trained decoder neural network of the transmitting device and one or more weights of the trained decoder neural network of the transmitting device. A model type may be a structure of the neural network, such as a description of the types, numbers, and/or interconnections (e.g., layer layout) of the nodes in the neural network. Model types may be actual representations of the neural network elements themselves and/or descriptors (e.g., model names, model numbers, model tags) that indicate the structure of the neural network, such as a description of the types, numbers, and/or interconnections (e.g., layer layout) of the nodes in the neural network. In some embodiments, a model type of a decoder neural network of the transmitting device may provide information to a receiving device to reconstitute a specific structure of the decoder neural network as was trained at the transmitting device. Weights of a neural network may be the values associated with the interconnections between the nodes of the neural network after training of the neural network. The weights of the trained decoder neural network of the transmitting device may be the values associated with the interconnections between the nodes of the decoder neural network after training at the transmitting device. In some embodiments, two decoder neural networks having the same model type may have the same structure such that applying the same weights to the two decoder neural networks will result in the same decompressed output of the two decoder neural networks based on the same compressed input being provided to each decoder neural network. In this manner, a receiving device having a model type of a trained decoder neural network of the transmitting device and weights of the trained decoder neural network of the transmitting device may configure a decoder neural network of the receiving device to recover the same decompressed output as would be recovered by the trained decoder neural network of the transmitting device from a common compressed input without having to spend time to actually train the decoder neural network of the receiving device.

In block 509, the processor of the transmitting device may perform operations including compressing the transmit waveform distortion information for the transmitting device into compressed transmit waveform distortion information using the encoder neural network. In some embodiments, the compression of the transmit waveform distortion information for the transmitting device into compressed transmit waveform distortion information may be performed after the encoder neural network is trained to achieve a selected level of compression for the transmit waveform distortion information. For example, the trained encoder neural network may compress the obtained TX waveform distortion information to the selected level of compression for sending to the receiving device.

In block 510, the processor of the transmitting device may perform operations including sending the compressed TX waveform distortion information of the transmitting device, the one or more weights, and/or the model type to the receiving device in a configuration that enables the receiving device to use the one or more weights and/or the model type to configure a decoder neural network of the receiving device to recover the TX waveform distortion information of the transmitting device from the compressed TX waveform distortion information. The compressed TX waveform distortion information of the transmitting device, the model type, and the weights may be sent to the receiving device in a configuration that enables the receiving device to use the model type and the weights to configure a decoder neural network of the receiving device to recover the TX waveform distortion information of the transmitting device from the compressed TX waveform distortion information of the transmitting device. In some embodiments, the compressed TX waveform distortion information of the transmitting device, the model type, and the weights may be sent together. In some embodiments, the compressed TX waveform distortion information of the transmitting device, the model type, and the weights may be sent separately. In some embodiments, the compressed TX waveform distortion information of the transmitting device, the model type, and the weights may be sent in overhead information exchanged between the transmitting computing device and the receiving computing device. In some embodiments, the compressed TX waveform distortion information of the transmitting device may be sent in control information for each slot to be transmitted. The compressed TX waveform distortion information may depend on the data that may be sent on each slot because the data to be sent may impact the OFDM waveform. Providing the compressed TX waveform distortion information on a per slot basis may enable a receiving device to mitigate the TX waveform distortion on a per slot basis. In some embodiments, compressed TX waveform distortion information and the model type and the weights may be signaled at different periodicities. In some embodiments, the model type and the weights may be signaled less frequently than the compressed TX waveform distortion information of the transmitting device. For example, compressed TX waveform distortion information may be sent in control information for each slot and the weights may be sent at a periodicity greater than every slot (e.g., less frequently than the compressed TX waveform distortion information). Weights and/or model types may be sent at much larger time scales than compressed TX waveform distortion information as the encoder neural network and decoder neural network of the transmitting device may be updated infrequently.

Figure 6:
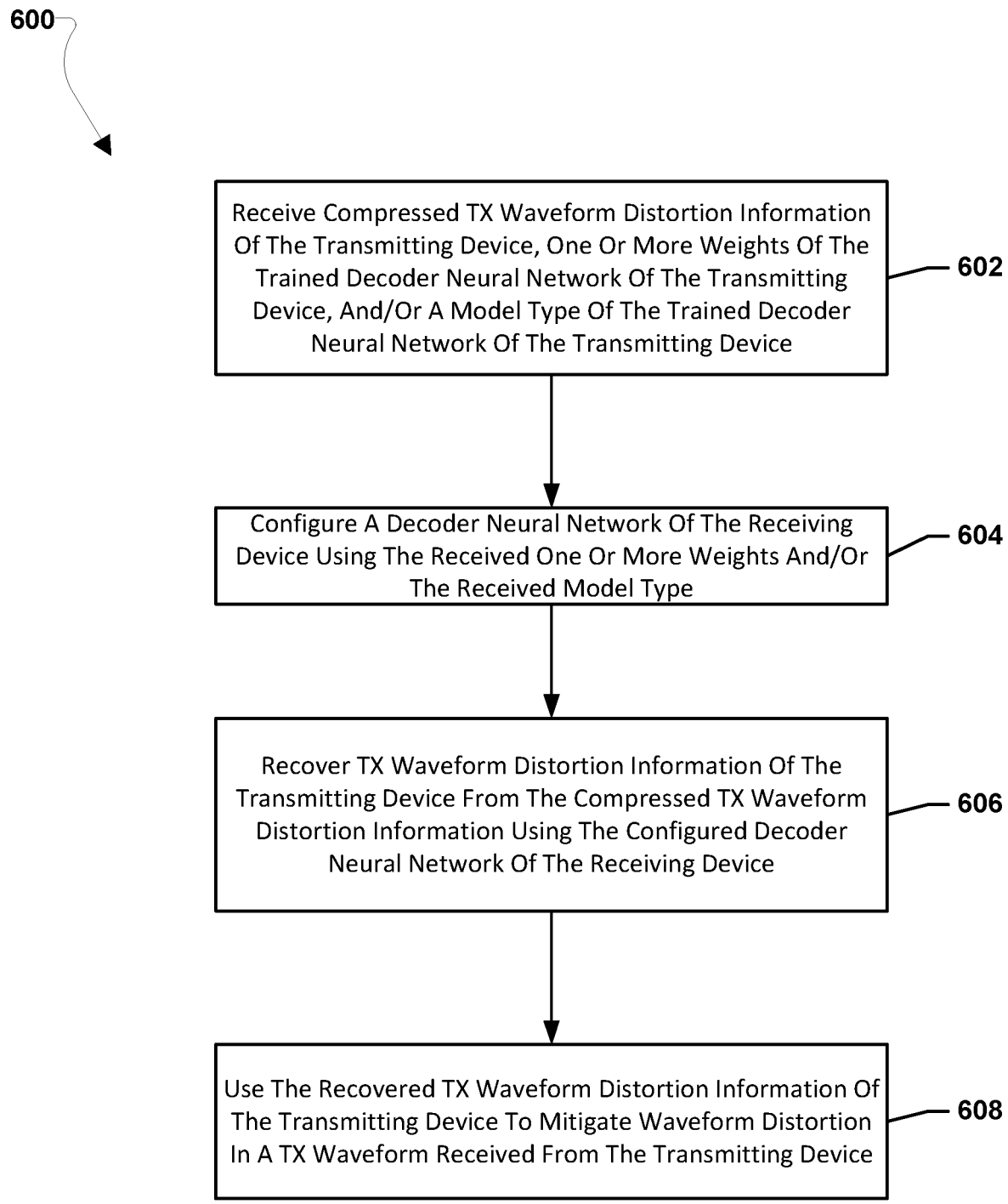
FIG. 6 is a process flow diagram illustrating operations of a method for wireless communication performed by a processor of a receiving device receiving a waveform from a transmitting device in accordance with various embodiments.

FIG. 6 is a process flow diagram of an example method 600 for wireless communication performed by a processor of a receiving device receiving a waveform from a transmitting device according to various embodiments. With reference to FIGS. 1-6, the method 600 may be implemented by a processor (such as 212, 216, 252 or 260) of a receiving device, such as a wireless device (UE computing device) (e.g., wireless device 120a-120e, 200, 320) and/or a base station (e.g., the base station 110a, 350, etc.) implementing one or more neural networks (e.g., neural network 400). The operations of method 600 may be performed in conjunction with the operations of method 500 (FIG. 5). As one example, in UL communications in a 3GPP network, the receiving device may be a base station (e.g., a gNB) and the transmitting device may be a UE computing device. As another example, in DL communications in a 3GPP network, the receiving device may be a UE computing device and the transmitting device may be a base station (e.g., a gNB).

In block 602, the processor of the receiving device may perform operations including receiving a compressed TX waveform distortion information of the transmitting device, one or more weights of a trained decoder neural network of the transmitting device, and/or a model type of the trained decoder neural network of the transmitting device. For example, the compressed TX waveform distortion information, the model type, and the weights may be the compressed TX waveform distortion information, the model type, and the weights of a transmitting device performing operations of method 500 of FIG. 5. In some embodiments, the compressed TX waveform distortion information of the transmitting device, the model type, and the weights may be received in overhead information. In some embodiments, the compressed TX waveform distortion information of the transmitting device may be received in control information for each slot to be transmitted.

In some embodiments, the model type and the weights may be received directly from the transmitting device. For example, the transmitting device may be a UE computing device and the UE computing device may send the model type and the weights to a base station as part of initial registration procedures between the UE computing device and the base station to receive services in the cell served by the base station. The base station may be the receiving device and may utilize the model type and the weights to mitigate distortion in the TX waveform sent by the UE computing device. In some embodiments, the model type and the weights may be received from a base station other than the transmitting device. For example, the model type and the weights may be values stored and shared among devices in a communication network. The model type and the weights of base stations may be shared among devices, such that a device may receive the model type and the weights for another device indirectly. As one example, base stations of neighbor cells may share their model types and weights with one another and with UE computing devices in their respective cells to support UE computing device mobility and handoff. As another example, UE computing model type and weights may be centrally stored such that a base station may retrieve the model type and the weights for a UE computing device upon discovery of the UE computing device without the UE computing device needing to directly transmit the model type and the weights to the base station, etc.

In some embodiments, base station compressed TX waveform distortion information may be centrally stored in addition to the model type, and/or weights so that a UE computing device may retrieve the compressed TX waveform distortion information, the model type, and/or the weights for a next base station before entering the coverage area of that base station and without the UE computing device needing to directly receive the compressed TX waveform distortion information, the model type, and/or the weights from that next base station, etc. Storing of compressed TX waveform distortion information may be useful in circumstances in which network side transmitters send the same data multiple times (e.g., a service description that is sent periodically) and a UE computing device uses the compressed TX waveform distortion information from a next cell to be set up ahead of time to receive the same data the next cell.

In block 604, the processor of the receiving device may perform operations including configuring a decoder neural network of the receiving device using the received one or more weights and/or the received model type. A model type may be a structure of the neural network, such as a description of the types, numbers, and/or interconnections (e.g., layer layout) of the nodes in the neural network. Model types may be actual representations of the neural network elements themselves and/or descriptors (e.g., model names, model numbers, model tags) that indicate the structure of the neural network, such as a description of the types, numbers, and/or interconnections (e.g., layer layout) of the nodes in the neural network. Weights of a neural network may be the values associated with the interconnections between the nodes of the neural network after training of the neural network. In some embodiments, a receiving device having a model type of a trained decoder neural network of the transmitting device and weights of the trained decoder neural network of the transmitting device may configure a decoder neural network of the receiving device to recover the same decompressed output as would be recovered by the trained decoder neural network of the transmitting device from the compressed TX waveform distortion information of the transmitting device received from the transmitting device. In this manner, the receiving device may configure its decoder neural network as a trained neural network without having to spend time to actually train its decoder neural network.

In block 606, the processor of the receiving device may perform operations including recovering TX waveform distortion information of the transmitting device from the compressed TX waveform distortion information using the configured decoder neural network of the receiving device. In some embodiments, the TX waveform distortion information may include a two-dimensional map of distortion error due to signal clipping of OFDM symbols within a slot for one or more antennas of the transmitting device. The receiving device may recover the same two-dimensional map of distortion that was originally created at the transmitting device In block 608, the processor of the receiving device may perform operations including using the TX waveform distortion information of the transmitting device to mitigate waveform distortion in a TX waveform received from the transmitting device. Mitigating the waveform distortion may include using the TX waveform distortion information to reconstitute the original TX waveform signal at the receiving device. In this manner, by mitigating the waveform distortion, the receiving device may compensate for any distortion caused by the transmitting device itself, such as distortion caused by power amplifiers of the transmitting device.

Figure 7A:
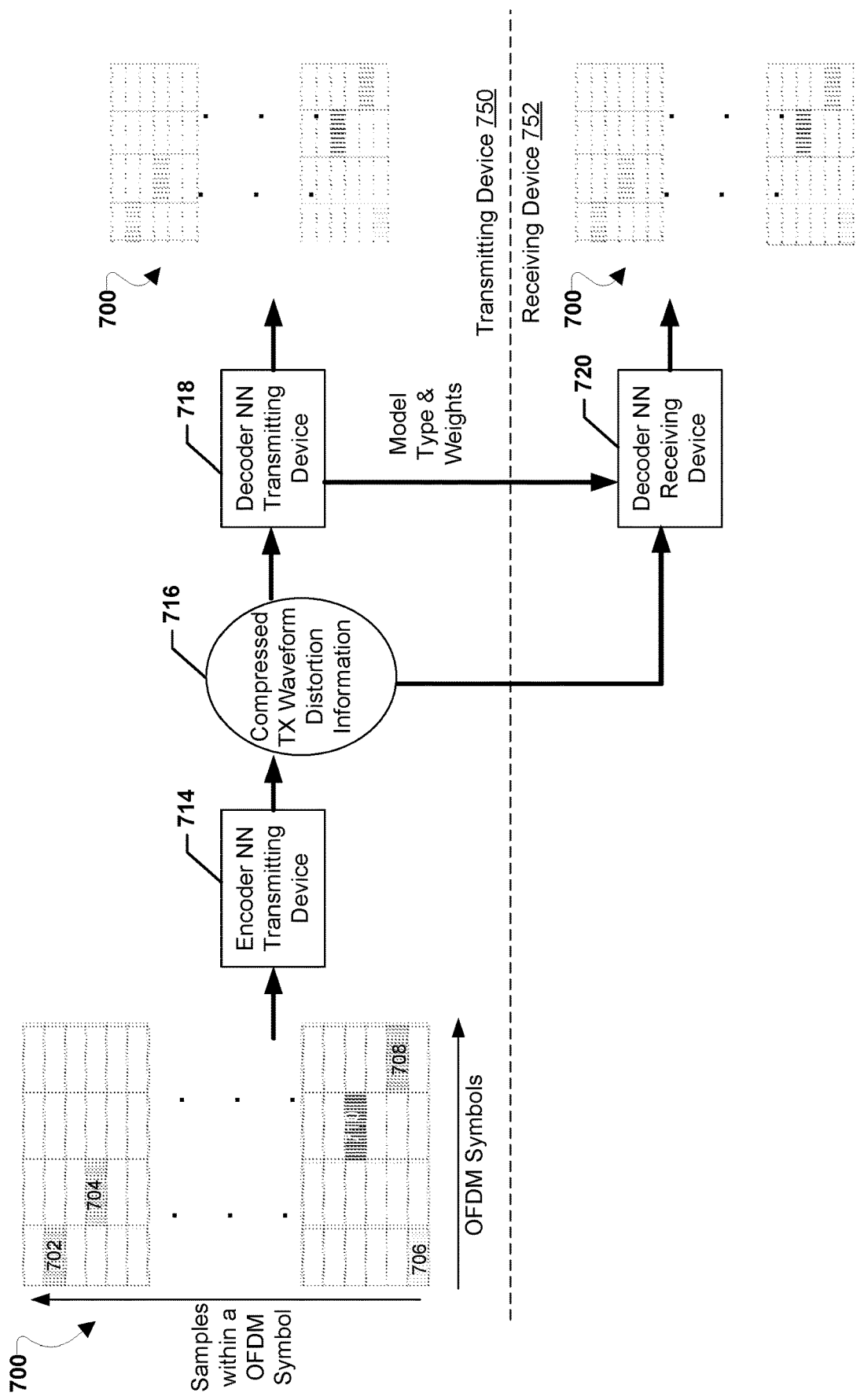
FIG. 7A is a block diagram illustrating example operations for using neural networks to compress distortion information in according with various embodiments.

FIG. 7A illustrates example interactions of a receiving device and transmitting device performing operations of methods 500 and 600 to leverage neural networks to provide distortion information from the transmitting device to the receiving device. With reference to FIGS. 1-7A, interactions illustrated and discussed may be implemented by a processor (such as 212, 216, 252 or 260) of a transmitting device 750, such as a wireless device (UE computing device) (e.g., wireless device 120a-120e, 200, 320) and/or a base station (e.g., the base station 110a, 350, etc.) implementing one or more neural networks (e.g., neural network 400) transmitting a TX waveform to a receiving device 752, such as a wireless device (UE computing device) (e.g., wireless device 120a-120e, 200, 320) and/or a base station (e.g., the base station 110a, 350, etc.) implementing one or more neural networks (e.g., neural network 400).

The transmitting device 750 may obtain a two-dimensional distortion map 700 of the distortion error due to signal clipping for each transmit antenna of the transmitting device 750. The two-dimensional distortion map 700 is shown as an error map of a single transmit antenna for ease of illustration. Each cell in the grid represents a time domain sample within an OFDM symbol with the shaded blocks 702, 704, 706, 708, and 710 representing different levels of transmit waveform distortion, typically represented as a complex number.

The transmitting device 750 may input the two-dimensional distortion map 700 to an encoder neural network 714 (e.g., neural network 400) of the transmitting device 750. The output of the encoder neural network 714 may be compressed TX waveform distortion information 716. The compressed TX waveform distortion information 716 may be output by the transmitting device 750 to the decoder neural network 718 (e.g., neural network 400) of the transmitting device 750 as the input to the decoder neural network 718.

The transmitting device 750 may train its encoder neural network 714 and decoder neural network 718 until a selected level of compression is achieved by the encoder neural network 714 and the two-dimensional distortion map 700 is correctly output by the decoder neural network 718. For example, the decoder neural network 718 of the transmitting device 750 may be considered trained when the output compressed TX waveform distortion information 716 that is the compressed TX waveform distortion map 700 provided as input to the decoder neural network 718 of the transmitting device 750 results in the decoder neural network 718 outputting a correct copy of the original distortion map 700.

In response to the decoder neural network 718 of the transmitting device 750 being trained, the transmitting device 750 may determine the model type of the trained decoder neural network 718 of the transmitting device 750 and the weights of the trained decoder neural network 718 of the transmitting device 750. Once the encoder neural network 714 and the decoder neural network 718 are trained, the transmitting device 750 may send the compressed TX waveform distortion information 716 and the model type and weights of the trained decoder neural network 718 to the receiving device 752.

The receiving device 752 may configure its decoder neural network 720 using the received model type and weights. In this manner, the decoder neural network 720 may effectively be configured to be a copy of the trained decoder neural network 718 without having to actually undergo training of the decoder neural network 720.

The receiving device 752 may input the compressed TX waveform distortion information 716 into its decoder neural network 720 and the output may be the original distortion map 700. The receiving device 752 may use the distortion map 700 to mitigate TX waveform distortion in a transmit waveform received from the transmitting device 750.

Figure 7B:
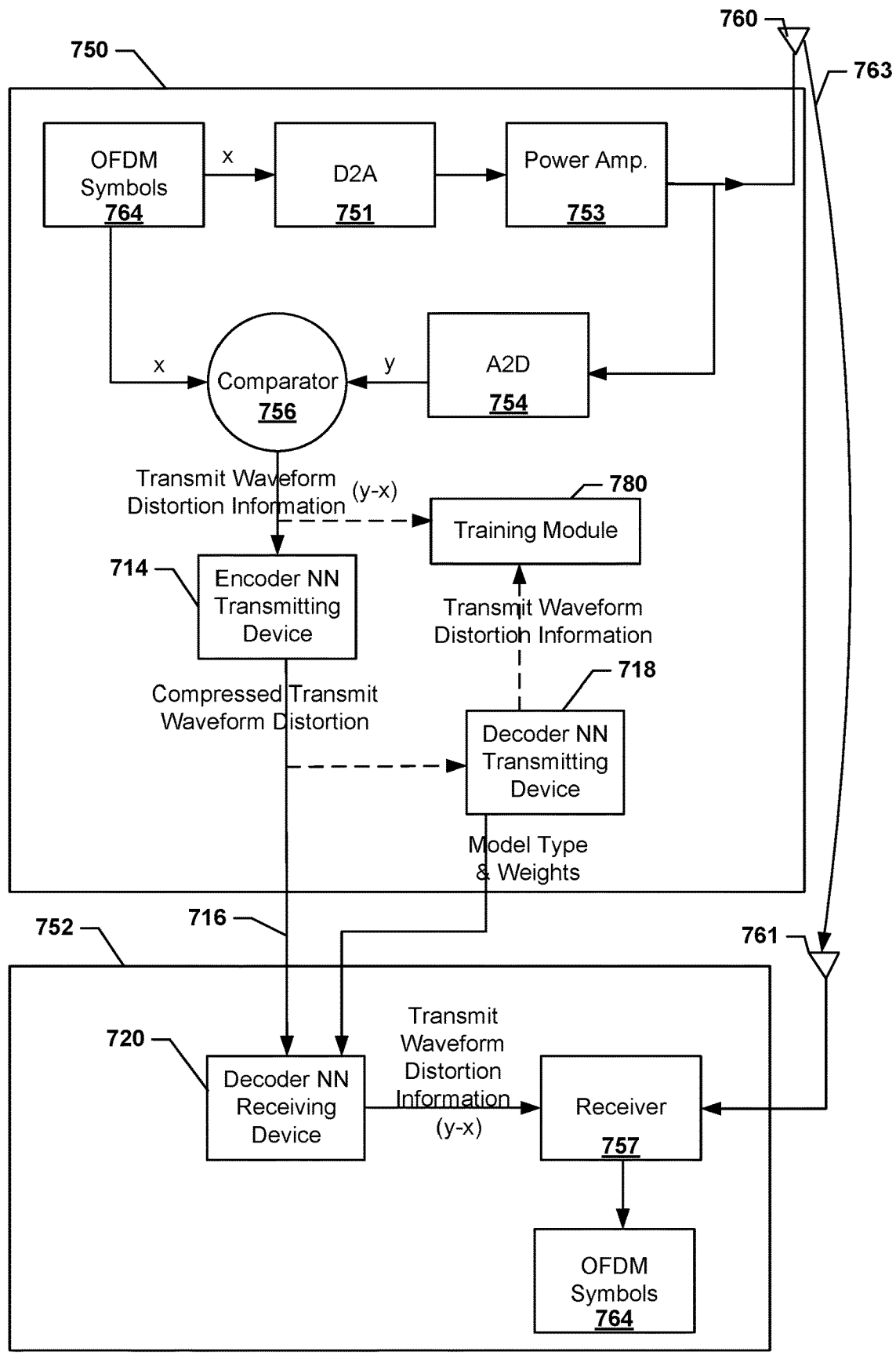
FIG. 7B is a block diagram illustrating example operations for using neural networks to compress distortion information in according with various embodiments.

FIG. 7B illustrates additional example interactions of the receiving device 752 and transmitting device 750 of FIG. 7A performing operations of methods 500 and 600 to leverage neural networks to provide distortion information to the receiving device 752 from the transmitting device 750. With reference to FIGS. 1-7B, interactions illustrated and discussed may be implemented by a processor (such as 212, 216, 252 or 260) of a transmitting device 750, such as a wireless device (UE computing device) (e.g., wireless device 120a-120e, 200, 320) and/or a base station (e.g., the base station 110a, 350, etc.) implementing one or more neural networks (e.g., neural network 400) transmitting a TX waveform to a receiving device 752, such as a wireless device (UE computing device) (e.g., wireless device 120a-120e, 200, 320) and/or a base station (e.g., the base station 110a, 350, etc.) implementing one or more neural networks (e.g., neural network 400).

FIG. 7B illustrates that OFDM symbols 764 may be output as a digital representation of the transmit waveform (x) passed to a digital-to-analog converter (D2A) 751 and power amplifier 753 for transmission via an antenna 760 of the transmitting device 750 in a TX waveform 763. The TX waveform 763 may be an analog signal sent over the air to the receiving device 752. The operations to transmit the TX waveform 763, such as the power amplification, etc., may cause signal distortion which may be measured by tapping the signal output to the antenna 760 and passing that output to an analog-to-digital converter (A2D) 754. The output of the A2D 754 may be a digital representation of the distorted TX waveform (y). The distortion present in the distorted TX waveform (y) may be a function of the distortion caused and/or experienced in the transmit chain of the transmitting device 750. The digital representation of the transmit waveform (x) and the digital representation of the distorted TX waveform (y) may be passed to a comparator 756. The comparator 756 may determine the difference between the two waveforms, such as y-x, and that difference may be the TX waveform distortion information of the transmitting device 750. That TX waveform distortion information of the transmitting device 750 (e.g., y-x) may be provided to the encoder neural network 714 of the transmitting device 750. The encoder neural network 714 may compress the TX waveform distortion information of the transmitting device 750 into compressed TX waveform distortion information 716. Additionally, the TX waveform distortion information of the transmitting device 750 (e.g., y-x) may be provided to a training module 780 configured to control training of the encoder neural network 714 and the decoder neural network 718. For example, the training module 780 may apply one or more loss functions used for training the encoder neural network 714 and/or the decoder neural network 718, such as a mean squared error (MSE) loss function.

In a training mode of operation, the compressed TX waveform distortion information 716 may be passed to the decoder neural network 718 of the transmitting device 750 and the decoder neural network 718 may recover TX waveform distortion information (e.g., y-x) from the compressed TX waveform distortion information 716. The output of the decoder neural network 718 may be output to the training module 780 and compared to the TX waveform distortion information input to the encoder neural network 714. The training module 780 of the transmitting device 750 may train its encoder neural network 714 and decoder neural network 718 until a selected level of compression is achieved by the encoder neural network 714 and the TX waveform distortion inform cation of the transmitting device 750 (e.g., y-x) is correctly output by the decoder neural network 718. The training may include applying a loss function, such as MSE loss, between the input to the encoder neural network 714 and the output of the decoder neural network 718. For example, the decoder neural network 718 of the transmitting device 750 may be considered trained when the output compressed TX waveform distortion information 716 that is the compressed TX waveform distortion information 716 provided as input to the decoder neural network 718 of the transmitting device 750 results in the decoder neural network 718 outputting a correct copy of the original TX waveform distortion information of the transmitting device 750 (e.g., a correct copy of y-x).

In response to the decoder neural network 718 of the transmitting device 750 being trained, the transmitting device 750 may determine the model type of the trained decoder neural network 718 of the transmitting device 750 and/or the one or more weights of the trained decoder neural network 718 of the transmitting device 750. Once the encoder neural network 714 and the decoder neural network 718 are trained, the transmitting device 750 may send the compressed TX waveform distortion information 716, the model type of the trained decoder neural network 718, and/or the one or more weights of the trained decoder neural network 718 to the receiving device 752. The compressed TX waveform distortion information 716, the model type of the trained decoder neural network 718, and/or the one or more weights of the trained decoder neural network 718 may be sent in various manners, such as in overhead signaling, out-of-band signaling, etc.

The receiving device 752 may configure its decoder neural network 720 using the received one or more weights and/received model type. In this manner, the decoder neural network 720 may effectively be configured to be a copy of the trained decoder neural network 718 without having to actually undergo training of the decoder neural network 720.

The receiving device 752 may input the compressed TX waveform distortion information 716 into its decoder neural network 720 and the output may be the original TX waveform distortion information of the transmitting device 750 (e.g., a recovered copy of y-x). The receiving device 752 may pass this TX waveform distortion information of the transmitting device 750 (e.g., a recovered copy of y-x) to the receiver 757 to mitigate TX waveform distortion in a transmit waveform 763 received via an antenna 761 of the receiving device 752 from the transmitting device 750. The receiver 757 of the receiving device 752 may use the recovered TX waveform distortion information of the transmitting device 750 (e.g., a recovered copy of y-x) to mitigate waveform distortion and receive the OFDM symbols 764 transmitted in the transmit waveform 763.

Figure 8:
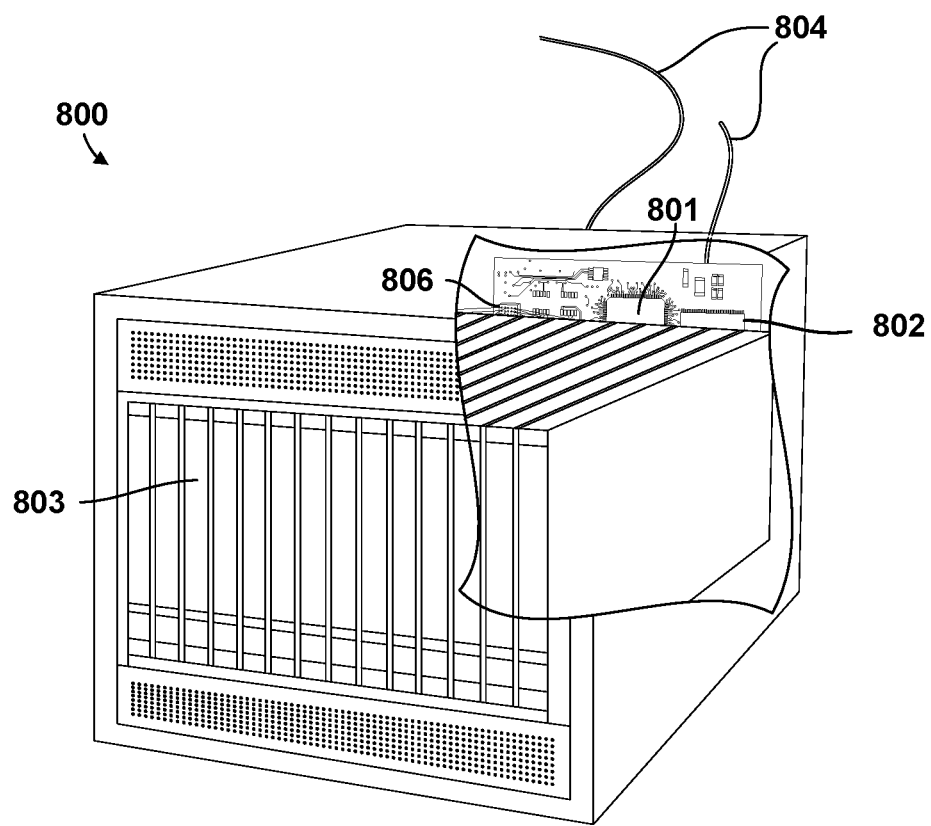
FIG. 8 is a component block diagram of a network computing device suitable for use with various embodiments.

Various embodiments may be implemented on a variety of wireless network devices, an example of which is illustrated in FIG. 8 in the form of a wireless network computing device 800 functioning as a network element of a communication network, such as a base station. Such network computing devices may include at least the components illustrated in FIG. 8. With reference to FIGS. 1-8, the network computing device 800 may typically include a processor 801 coupled to a volatile memory 802 and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may be coupled to one or more antennas for sending and receiving electromagnetic radiation for establishing a wireless communication link. The network computing device 800 may include additional access ports, such as USB, Firewire, Thunderbolt, and the like for coupling to peripherals, external memory, or other devices.

Figure 9:
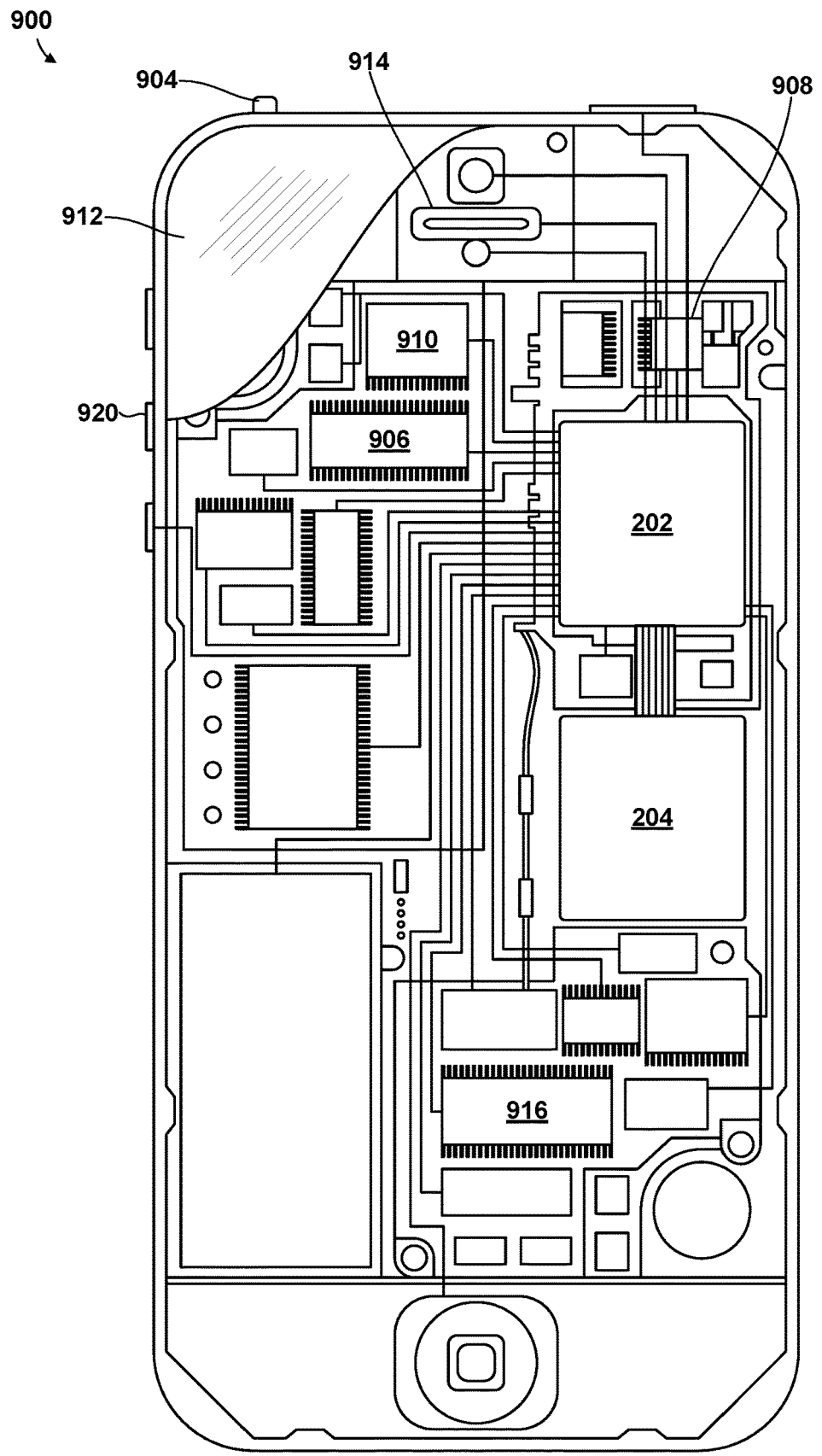
FIG. 9 is a component block diagram of a wireless communication device suitable use with various embodiments.

Various embodiments may be implemented on a variety of wireless devices (e.g., the wireless device 120*a*-120*e*, 200, 320), an example of which is illustrated in FIG. 9 in the form of a smartphone 900. The smartphone 900 may include a first SOC 202 (e.g., a SOC-CPU) coupled to a second SOC 204 (e.g., a 5G capable SOC). The first and second SOCs 202, 204 may be coupled to internal memory 906, 916, a display 912, and to a speaker 914. Additionally, the smartphone 900 may include an antenna 904 for sending and receiving electromagnetic radiation that may be connected to a wireless data link and/or cellular telephone transceiver 908 coupled to one or more processors in the first and/or second SOCs 202, 204. Smartphones 900 typically also include menu selection buttons or rocker switches 920 for receiving user inputs.

A typical smartphone 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 908 and CODEC 910 may include a digital signal processor (DSP) circuit (not shown separately).

The processors of the wireless network computing device 800 and the smart phone 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 906, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500 and/or 600 may be substituted for or combined with one or more operations of the methods 500 and/or 600.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of wireless communication performed by a processor of a transmitting device transmitting a waveform to a receiving device, comprising:

obtaining transmit waveform distortion information of the transmitting device;

compressing the transmit waveform distortion information of the transmitting device into compressed transmit waveform distortion information using an encoder neural network; and sending the compressed transmit waveform distortion information and one or more decoder neural network weights to the receiving device in a configuration that enables the receiving device to use the one or more decoder neural network weights to configure a decoder neural network of the receiving device to recover the transmit waveform distortion information of the transmitting device from the compressed transmit waveform distortion information.

2. The method of claim 1, further comprising:
determining a model type of a decoder neural network of the transmitting device, wherein sending the compressed transmit waveform distortion information and the one or more decoder neural network weights to the receiving device comprises sending the compressed transmit waveform distortion information, the one or more decoder neural network weights, and the model type to the receiving device.

3. The method of claim 1, wherein sending the compressed transmit waveform distortion information and the one or more decoder neural network weights to the receiving device comprises sending the compressed transmit waveform distortion information and the one or more decoder neural network weights to the receiving device in control information for each slot to be transmitted.

4. The method of claim 1, wherein the transmitting device is a user equipment (UE) computing device and the receiving device is a base station.

5. The method of claim 1, wherein the transmitting device is a base station and the receiving device is a user equipment (UE) computing device.

6. The method of claim 1, further comprising:
training the encoder neural network to compress the transmit waveform distortion information of the transmitting device into the compressed transmit waveform distortion information; and
training a decoder neural network of the transmitting device to recover the transmit waveform distortion information of the transmitting device from the compressed transmit waveform distortion information, wherein the one or more decoder neural network weights are weights of the trained decoder neural network of the transmitting device.

7. The method of claim 6, wherein the encoder neural network and the decoder neural network of the of the transmitting device are trained using unsupervised learning algorithms.

8. The method of claim 6, wherein training the encoder neural network and training the decoder neural network of the transmitting device comprise training the encoder neural network and the decoder neural network of the transmitting device for one transmit antenna of the transmitting device.

9. The method of claim 6, wherein training the encoder neural network and training the decoder neural network of the transmitting device comprise the encoder neural network and the decoder neural network of the transmitting device for each transmit antenna of the transmitting device.

10. A method of wireless communication performed by a processor of a receiving device configured to receive a waveform from a transmitting device, comprising:
receiving compressed transmit waveform distortion information of the transmitting device and one or more weights of a trained decoder neural network of the transmitting device;
configuring a decoder neural network of the receiving device using the received one or more weights; and
recovering transmit waveform distortion information of the transmitting device from the compressed transmit waveform distortion information of the transmitting device using the configured decoder neural network of the receiving device.

11. The method of claim 10, further comprising:
using the recovered transmit waveform distortion information of the transmitting device to mitigate waveform distortion in a transmit waveform received from the transmitting device.

12. The method of claim 10, wherein:
receiving the compressed transmit waveform distortion information of the transmitting device and the one or more weights of the trained decoder neural network of the transmitting device comprises receiving the compressed transmit waveform distortion information of the transmitting device, the one or more weights of the trained decoder neural network of the transmitting device, and a model type of the trained decoder neural network of the transmitting device; and
configuring the decoder neural network of the receiving device using the received one or more weights comprises configuring the decoder neural network of the receiving device using the received one or more weights and the received model type.

13. The method of claim 10, wherein the recovered transmit waveform distortion information comprises a two-dimensional map of distortion error due to signal clipping of orthogonal frequency division multiplexing (OFDM) symbols within a slot for one or more antennas of the transmitting device.

14. The method of claim 10, wherein receiving the compressed transmit waveform distortion information of the transmitting device and one or more weights of a trained decoder neural network of the transmitting device comprises receiving compressed transmit waveform distortion information of the transmitting device and one or more weights of a trained decoder neural network of the transmitting device in control information for each slot to be transmitted.

15. The method of claim 10, wherein the receiving device is a base station and the transmitting device is a user equipment (UE) computing device.

16. The method of claim 15, wherein the compressed transmit waveform distortion information and the one or more weights are received directly from the UE computing device.

17. The method of claim 10, wherein the compressed transmit waveform distortion information and the one or more weights are received from a base station other than the transmitting device.

18. A transmitting device, comprising:
a processor configured with processor-executable instructions to perform operations comprising:
obtaining transmit waveform distortion information of the transmitting device;
compressing the transmit waveform distortion information of the transmitting device into compressed transmit waveform distortion information using an encoder neural network; and
sending the compressed transmit waveform distortion information and one or more decoder neural network weights to a receiving device in a configuration that enables the receiving device to use the one or more decoder neural network weights to configure a decoder neural network of the receiving device to recover the transmit waveform distortion information of the transmitting device from the compressed transmit waveform distortion information.

19. The transmitting device of claim 18, wherein:
the processor is configured with processor-executable instructions to perform operations further comprising determining a model type of a decoder neural network of the transmitting device; and
the processor is configured with processor-executable instructions to perform operations such that sending the compressed transmit waveform distortion information and the one or more decoder neural network weights to the receiving device comprises sending the compressed transmit waveform distortion information, the one or more decoder neural network weights, and the model type to the receiving device.

20. The transmitting device of claim 18, wherein the processor is configured with processor-executable instructions to perform operations such that sending the compressed transmit waveform distortion information and the one or more decoder neural network weights to the receiving device comprises sending the compressed transmit waveform distortion information and the one or more decoder neural network weights to the receiving device in control information for each slot to be transmitted.

21. The transmitting device of claim 18, wherein the processor is configured with processor-executable instructions to perform operations further comprising:
training the encoder neural network to compress the transmit waveform distortion information of the transmitting device into the compressed transmit waveform distortion information; and
training a decoder neural network of the transmitting device to recover the transmit waveform distortion information of the transmitting device from the compressed transmit waveform distortion information, wherein the one or more decoder neural network weights are weights of the trained decoder neural network of the transmitting device.

22. The transmitting device of claim 21, wherein the processor is configured with processor-executable instructions to perform operations such that the encoder neural network and the decoder neural network of the of the transmitting device are trained using unsupervised learning algorithms.

23. The transmitting device of claim 21, wherein the processor is configured with processor-executable instructions to perform operations such that training the encoder neural network and training the decoder neural network of the transmitting device comprise training the encoder neural network and the decoder neural network of the transmitting device for one transmit antenna of the transmitting device.

24. The transmitting device of claim 21, wherein the processor is configured with processor-executable instructions to perform operations such that training the encoder neural network and training the decoder neural network of the transmitting device comprise the encoder neural network and the decoder neural network of the transmitting device for each transmit antenna of the transmitting device.

25. The transmitting device of claim 21, wherein the transmitting device is a base station or a user equipment (UE) computing device.

26. A receiving device, comprising:
a processor configured with processor-executable instructions to perform operations comprising:
receiving compressed transmit waveform distortion information of a transmitting device and one or more weights of a trained decoder neural network of the transmitting device;
configuring a decoder neural network of the receiving device using the received one or more weights; and
recovering transmit waveform distortion information of the transmitting device from the compressed transmit waveform distortion information of the transmitting device using the configured decoder neural network of the receiving device.

27. The receiving device of claim 26, wherein the processor is configured with processor-executable instructions to perform operations further comprising:
using the recovered transmit waveform distortion information of the transmitting device to mitigate waveform distortion in a transmit waveform received from the transmitting device.

28. The receiving device of claim 26, wherein the processor is configured with processor-executable instructions to perform operations such that:
receiving the compressed transmit waveform distortion information of the transmitting device and the one or more weights of the trained decoder neural network of the transmitting device comprises receiving the compressed transmit waveform distortion information of the transmitting device, the one or more weights of the trained decoder neural network of the transmitting device, and a model type of the trained decoder neural network of the transmitting device; and
configuring the decoder neural network of the receiving device using the received one or more weights comprises configuring the decoder neural network of the receiving device using the received one or more weights and the received model type.

29. The receiving device of claim 26, wherein the processor is configured with processor-executable instructions to perform operations such that the recovered transmit waveform distortion information comprises a two-dimensional map of distortion error due to signal clipping of orthogonal frequency division multiplexing (OFDM) symbols within a slot for one or more antennas of the transmitting device.

30. The receiving device of claim 26, wherein the processor is configured with processor-executable instructions to perform operations such that receiving the compressed transmit waveform distortion information of the transmitting device and one or more weights of the trained decoder neural network of the transmitting device comprises receiving compressed transmit waveform distortion information of the transmitting device and one or more weights of the trained decoder neural network of the transmitting device in control information for each slot to be transmitted.

* * * * *